United States Patent
Yoo

(10) Patent No.: US 12,208,432 B2
(45) Date of Patent: Jan. 28, 2025

(54) METHOD OF DRAWING AN AXIAL TUBE MADE OF ALUMINUM MATERIAL AND A COWL CROSS BAR MANUFACTURED USING SAME

(71) Applicants: HYUNDAI MOTOR COMPANY, Seoul (KR); KIA CORPORATION, Seoul (KR)

(72) Inventor: Chang-Yeol Yoo, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 282 days.

(21) Appl. No.: 17/825,903

(22) Filed: May 26, 2022

(65) Prior Publication Data

US 2023/0166310 A1 Jun. 1, 2023

(30) Foreign Application Priority Data

Nov. 29, 2021 (KR) ........................ 10-2021-0166910

(51) Int. Cl.
| | |
|---|---|
| *B21C 23/00* | (2006.01) |
| *B21C 1/18* | (2006.01) |
| *B21C 23/08* | (2006.01) |
| *B62D 25/08* | (2006.01) |
| *B62D 25/14* | (2006.01) |
| *B62D 29/00* | (2006.01) |
| *C21D 8/10* | (2006.01) |
| *C21D 9/08* | (2006.01) |
| *C22F 1/047* | (2006.01) |

(52) U.S. Cl.
CPC .......... *B21C 23/002* (2013.01); *B21C 23/085* (2013.01)

(58) Field of Classification Search
CPC .... B62D 25/08; B62D 25/145; B62D 29/008; C21D 8/10; C21D 9/08; C22F 1/047
See application file for complete search history.

(56) References Cited

U.S. PATENT DOCUMENTS

| | | | |
|---|---|---|---|
| 4,805,435 A * | 2/1989 | Sukimoto | B21C 3/00 |
| | | | 72/283 |
| 2011/0296890 A1* | 12/2011 | Hisayuki | B21C 9/005 |
| | | | 72/283 |
| 2021/0163072 A1 | 6/2021 | Choi | |

FOREIGN PATENT DOCUMENTS

| | | | | |
|---|---|---|---|---|
| CN | 113102541 A | * | 7/2021 | ............. B21C 37/02 |
| KR | 20210067799 A | | 6/2021 | |

OTHER PUBLICATIONS

English translate (CN113102541A), retrieved date Jun. 29, 2024.*

* cited by examiner

*Primary Examiner* — Mohammed S. Alawadi
(74) *Attorney, Agent, or Firm* — Lempia Summerfield Katz LLC

(57) ABSTRACT

A method of drawing an axial tube made of an aluminum (Al) material for a cowl cross bar includes performing NaOH etching on an extruded pipe having a single diameter and made of an Al alloy and performing high frequency heat treatment on the extruded pipe to increase a tube reduction ratio of the extruded pipe. The cowl cross bar is manufactured having a large diameter section and a small diameter section have a difference in diameter, due to a tube reduction ratio, of 40% by a diameter reduction section. Therefore, even when an Al alloy is manufactured as the axial tube having different diameters, the occurrence of cracks is prevented.

10 Claims, 2 Drawing Sheets

METHOD OF DRAWING AN AXIAL TUBE MADE OF ALUMINUM MATERIAL AND A COWL CROSS BAR MANUFACTURED USING SAME

CROSS-REFERENCE(S) TO RELATED APPLICATIONS

This application claims priority to Korean Patent Application No. 10-2021-0166910, filed on Nov. 29, 2021, which is incorporated herein by reference in its entirety.

BACKGROUND OF PRESENT DISCLOSURE

Technical Field

Embodiments of the present disclosure relate to a cowl cross bar, and more particularly, to a cowl cross bar manufactured by a method of drawing an axial tube made of an aluminum material, in which cracks are prevented even when the aluminum material is manufactured into an axial tube with different diameters.

Description of Related Art

Generally, it is necessary to change a structure of a vehicle part in consideration of a layout in a vehicle. It is also often necessary to apply a specific manufacturing process for changing the structure of the vehicle part.

For example, a cowl cross bar applied to a cowl for separating an engine compartment of a vehicle and the vehicle interior has a structure, which should have a section of a pipe in which the diameter of the pipe varies. This is because a driver seat section requires a pipe having a large diameter so as to improve noise, vibration, harshness (NVH) performance, whereas a passenger seat section requires a pipe having a small diameter for weight reduction.

To this end, the cowl cross bar is made of a steel pipe. The steel pipe is divided into a driver seat section and a passenger seat section and is manufactured by welding pipes having different diameters.

However, since the cowl cross bar is manufactured by welding two steel pipes having different diameters, a weight of the cowl cross bar is heavy due to a characteristic of a welded product of the two steel pipes. Additionally, a decrease in bonding strength is inevitable due to corrosion of a welded portion between the two steel pipes.

In particular, a welding quality problem of a steel pipe type cowl cross bar can be solved by drawing an aluminum (Al) axial tube. However, since an Al extruded material lacks a stretching rate or ductility when compared with the steel pipe, when the Al extruded material is reduced by about 10% through a process of drawing the Al axial tube, there is a problem in that cracks are inevitably generated in the Al extruded material.

SUMMARY OF PRESENT DISCLOSURE

An embodiment of the present disclosure is directed to a drawing method for drawing an axial tube made of an aluminum (Al) material. The drawing method prevents generation of cracks even when the Al material is manufactured as an axial tube having different diameters. Particularly, an embodiment of the present disclosure is directed to a drawing method in which generation of cracks of the Al material is prevented during a process of reducing the axial tube. This is because a tube reduction ratio is increased due to high-frequency heating together with surface treatment of the Al extruded material for reducing a frictional force on an entire surface of the axial tube. Another embodiment of the present disclosure is directed to a cowl cross bar manufactured using the disclosed drawing method.

Other objects and advantages of the present disclosure should be understood from following description and should become apparent with reference to the embodiments of the present disclosure. Also, it should be apparent to those of ordinary skill in the art to which the present disclosure pertains that the objects and advantages of the present disclosure can be realized by the means as claimed and combinations thereof.

In accordance with an embodiment of the present disclosure, a method of drawing an axial tube made of an aluminum (Al) material is provided. The drawing method includes performing etching and heat treatment to improve a tube reduction ratio of an extruded pipe made of an Al alloy and includes reducing and drawing the extruded pipe to allow the extruded pipe to have a difference in diameter using an axial tube mold.

In an embodiment, compositional components of the Al alloy may include silicon (Si) ranging from 0.2 wt % to 0.6 wt %, iron (Fe) ranging 0.35 wt % or less, copper (Cu) ranging 0.1 wt % or less, magnesium (Mg) ranging from 0.45 wt % to 0.9 wt % or less, chromium (Cr) ranging 0.1 wt % or less, zinc (Zn) ranging 0.1 wt % or less, and titanium (Ti) ranging 0.1 wt % or less, and the remainder thereof may include Al.

In an embodiment, the extruded pipe may be subjected to the heat treatment after the etching.

In an embodiment, the etching may include sodium hydroxide (NaOH) etching, the NaOH etching may be performed at a NaOH concentration ranging from 0.5 normality (N) to 1 N for one to two minutes. Also, the NaOH etching may form surface roughness of the extruded pipe in a range of 0.15 μm<Ra<1.0 μm, where Ra is average roughness.

In an embodiment, the heat treatment may include high frequency heat treatment, and the high frequency heat treatment may be performed at a heat treatment temperature ranging from 200° C. to 300° C. for five to ten seconds.

In an embodiment, the high frequency heat treatment may improve the tube reduction ratio of the extruded pipe to 40% when compared to the tube reduction ratio without high frequency heat treatment.

In an embodiment, the extruded pipe may be formed in a cross-sectional variation structure in which a large diameter section and a small diameter section, which have the difference in diameter, are connected through a diameter reduction section. The extruded pipe may be formed at a tube reduction ratio of 40% with respect to the large diameter section and the small diameter section.

As an embodiment, the extruded pipe may be applied as a cowl cross bar constituting a cockpit module of a vehicle in the cross-sectional change structure.

In accordance with another embodiment of the present disclosure, a cowl cross bar is provided. The cowl cross bar includes an extruded pipe made of an aluminum (Al) alloy, which is subject to NaOH etching and high frequency heat treatment. A cross section of the extruded pipe is varied into a large diameter section, a diameter reduction section, and a small diameter section due to drawing an axial tube using an axial tube mold. The large diameter section is located at a driver seat section, and the diameter reduction section is located at a passenger seat section, and thus the extruded pipe is assembled with a cowl panel of a vehicle body.

DESCRIPTION OF SPECIFIC EMBODIMENTS

Embodiments of the present disclosure are described below in more detail with reference to the accompanying drawings. These embodiments are examples of the present disclosure and may be embodied in various other different forms by those of ordinary skill in the art to which the present disclosure pertains. Thus, the present disclosure is not limited to these embodiments.

Figure 1:
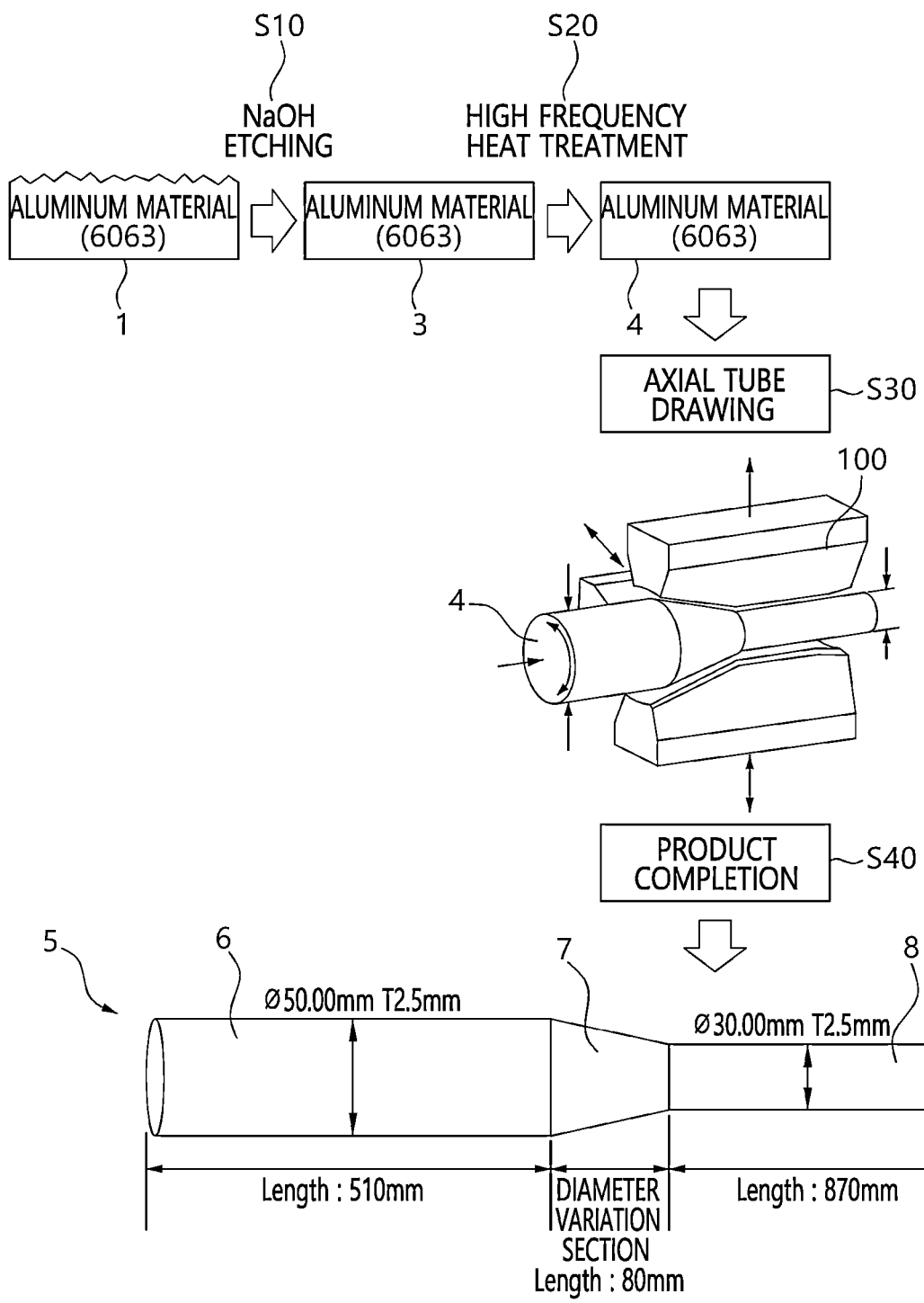
FIG. 1 is a flowchart illustrating a drawing method of an axial tube made of an aluminum (Al) material according to the present disclosure.

Referring to FIG. 1, a method of drawing an axial tube made of an aluminum (Al) material includes surface etching (S10), surface heat treatment (S20), axial tube drawing (S30), and product completion (S40). An extruded pipe 1 made of an Al alloy is manufactured as a drawn pipe 5 through an etched pipe 3 and a heat treatment pipe 4. In this embodiment, the extruded pipe 1 is an extruded pipe having a diameter of 50 mm. The drawn pipe 5 of an axial tube is a pipe having different diameters, in which a diameter is varied to 50 mm and 30 mm by drawing the axial tube.

For example, the Al alloy is an A6063-series alloy. Compositional components of the Al alloy include silicon (Si) ranging from 0.2 wt % to 0.6 wt %, iron (Fe) ranging 0.35 wt % or less, copper (Cu) ranging 0.1 wt % or less, magnesium (Mg) ranging from 0.45 wt % to 0.9 wt % or less, chromium (Cr) ranging 0.1 wt % or less, zinc (Zn) ranging 0.1 wt % or less, and titanium (Ti) ranging 0.1 wt % or less, and the remainder thereof includes Al.

For example, in the surface etching (S10), sodium hydroxide (NaOH) etching is applied to a surface of the extruded pipe 1. In this case, the NaOH etching removes oxides and foreign materials which are present on the surface of the extruded pipe 1 made of the Al alloy.

To this end, the NaOH etching treatment is performed at a NaOH concentration ranging from 0.5 normality (N) to 1 N for one to two minutes.

Table 1 shows a relationship between an etching solution and surface roughness of the extruded pipe 1, where Ra is average surface roughness.

TABLE 1

| Etching solution (NaOH) concentration | Time | Surface roughness (Ra, μm) | Surface roughness (Ra, μm) |
| --- | --- | --- | --- |
| 0 to 0.5 | One to two minutes | 1.8 | 6.0 |
| 0.5 to 1.0 | | 0.15 | 1.0 |
| 1 to 1.5 | | 1.0 | 3.0 |

Table of Relationship Between Etching Solution and Surface Roughness

From Table 1, it is confirmed that, as a result of the NaOH concentration/time condition, the surface roughness as well as the removal of foreign materials on the surface of the extruded pipe 1 was improved. However, when the NaOH etching concentration is increased, the Al material is etched in addition to the foreign materials being removed, and thus roughness is degraded. In order to prevent the roughness degradation, the NaOH etching concentration is set to a range from 0.5 N to 1.0 N as an optimal NaOH etching concentration.

As a result, the extruded pipe 1 is manufactured as the etched pipe 3 The etched pipe 3 has a surface roughness ranging from 0.15 to 1.0 at a NaOH etching concentration ranging from 0.5 N to 1.0 N.

For example, in the surface heat treatment (S20), high frequency heat treatment is performed on a surface of the etched pipe 3. The high frequency heat treatment improves formability of the pipe 3 and is suitable for solving a problem of cracks which may occur during the axial tube drawing (S30) due to the lack of a stretching rate or ductility of the Al alloy when compared with the steel pipe.

To this end, in the high frequency heat treatment, a heat treatment temperature ranges from 200° C. to 300° C., and a heat treatment time ranges from 5 to 10 seconds.

Table 2 shows a relationship between high frequency heating and a maximum tube reduction ratio of the heat treatment pipe 4.

TABLE 2

| High frequency heating temperature | Time | Maximum tube reduction ratio |
| --- | --- | --- |
| 100 to 200 | One to two minutes | 20% |
| 200 to 300 | | 40% |
| 300 to 400 | | 20% |

Table of Relationship Between High Frequency Heating and Tube Reduction Ratio

From Table 2, it can be confirmed that the maximum tube reduction ratio of the Al alloy is varied according to the heat treatment time and the high frequency temperature in the high frequency heat treatment. In this case, it was confirmed that, when the high frequency heat treatment temperature was 200° C. or less, a maximum tube reduction ratio was 20% (i.e., a tube reduction ratio when the diameter is reduced from 50 mm to 40 mm). Also, when the high frequency heat treatment temperature ranged from 200° C. to 300° C., the maximum tube reduction ratio was 40% (i.e., a tube reduction ratio when the diameter was reduced from 50 mm to 30 mm). Further, when the high frequency heat treatment temperature was 300° C. or higher, the maximum tube reduction ratio was degraded to 20% (i.e., a tube reduction ratio when the diameter was reduced from 50 mm to 40 mm). In this case, a cause of the degradation of the maximum tube reduction ratio is predicted that a surface temperature of Al rose so that the surface of Al was melted and a friction force was increased.

As a result, the etched pipe 3 is manufactured as the heat treatment pipe 4. The high frequency heat treatment temperature ranging from 200° C. to 300° C., at which a maximum tube reduction ratio of 40% (i.e., a tube reduction ratio when the diameter is reduced from 50 mm to 40 mm) was formed, was applied to the heat treatment pipe 4.

For example, in the axial tube drawing S30, the heat treatment pipe 4 is manufactured by being put into and drawn in an axial tube mold 100. In the axial tube mold 100, when compared with a draw speed in a large diameter section having a length 510 mm, a draw speed ranges between 0.5 m/minute to 1 m/minute in a variable section in which a diameter is 50 mm and a length is 80 mm. A draw speed ranges between 1 m/minute to 3 m/minute in a small diameter section in which a diameter of a reduced tube is 30 mm and a length thereof is 870 mm.

As a result, the heat treatment pipe 4 is manufactured as the reduced drawn pipe 5. The reduced drawn pipe 5 is manufactured to have a diameter reduction section 7, in which a diameter do of 50 mm is reduced to a diameter $d_1$ of 30 mm, between a large diameter section 6 having the diameter do of 50 mm and a small diameter section 8 having the diameter $d_1$ of 30 mm. In other words, the axial tube drawn pipe 5 is formed to have a tube reduction ratio of 40% between the large diameter section 6 and the small diameter section 8.

For example, the product completion (S40) is in a state in which the drawn pipe 5 is manufactured by being drawn in the axial tube mold 100.

Figure 2:
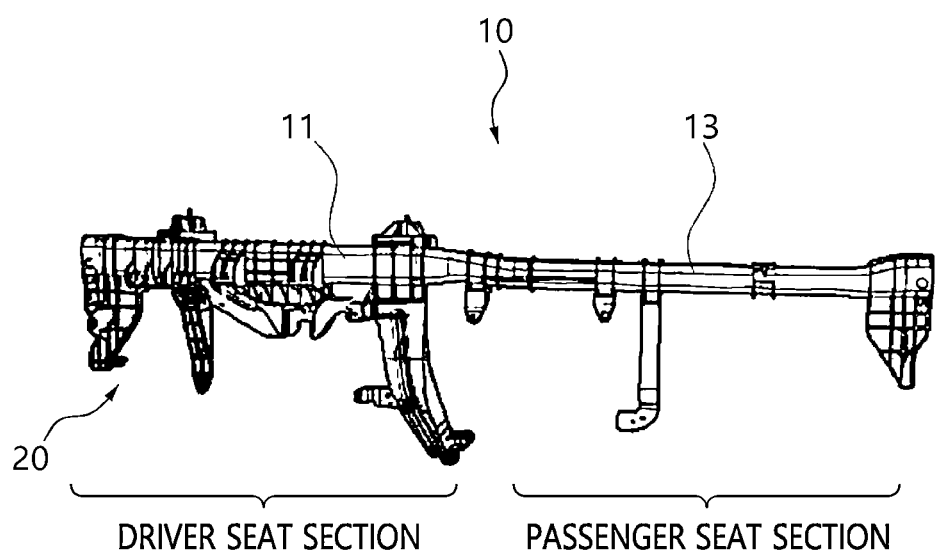
FIG. 2 is a diagram illustrating an example of a cowl cross bar manufactured by the drawing method of an axial tube made of an Al material according to the present disclosure.

Meanwhile, FIG. 2 illustrates an example in which the extruded pipe 1 is manufactured as a cowl cross bar 10 by the drawing method of an axial tube made of an Al material through the etched pipe 3, the heat treatment pipe 4, and the drawn pipe 5.

As shown in the drawing, the cowl cross bar 10 includes a driver seat section 11 and a passenger seat section 13. In this case, since the cowl cross bar 10 is the reduced drawn pipe 5 drawn by the axial tube mold 100 (see FIG. 1), the driver seat section 11 is equal to the large diameter section 6 having the diameter $d_0$ of 50 mm and the passenger seat section 13 is equal to the small diameter section 8 having the diameter $d_1$ of 30 mm A connection portion between the driver seat section 11 and the passenger seat section 13 is equal to the diameter reduction section 7 in which the diameter $d_0$ of 50 mm is reduced to the diameter $d_1$ of 30 mm.

Therefore, a cowl panel 20 is formed using the drawn pipe 5 (see FIG. 1) as the cowl cross bar 10. The drawn pipe 5 (see FIG. 1) is a component of a cockpit module of a vehicle, such as the role of the cowl cross bar 10, and may guide and support electronic components of the cockpit, such as a steering shaft, an instrument panel, an air conditioning system, an airbag, and an audio system. The cowl cross bar 10 may constitute a frame for preventing the vehicle from being bent or distorted in a left-right direction and for increasing durability of a vehicle body. Thereby, the cowl cross bar 10 may provide a guide surface on which the electronic components of the cockpit are installed and safely protect passengers in the case of a head-on collision.

As described above, the drawing method of an axial tube made of an Al material for the cowl cross bar 10 according to the present embodiment performs NaOH etching on the extruded pipe 1 having a single diameter and made of an Al alloy. Subsequently, the drawing method includes high frequency heat treatment on the extruded pipe 1 to increase a tube reduction ratio of the extruded pipe 1 and manufacturing the cowl cross bar 10. The large diameter section 6 and the small diameter section 8 of the cowl cross bar 10 have a difference in diameter due to a tube reduction ratio of 40% of the diameter reduction section 7, through the drawing of the extruded pipe 1 using the axial tube mold 100. Therefore, even when an A6063 aluminum alloy series, which is an Al material, is manufactured as an axial tube having different diameters, the occurrence of cracks is prevented. In particular, the tube reduction ratio is increased due to surface treatment of an Al extruded material for reducing a frictional force on an entire surface of the axial tube as well as high frequency heating so that occurrence of cracks of the Al material is prevented during the tube reduction process.

A drawing method of an axial tube made of an aluminum (Al) material, which is applied to manufacturing of a cowl cross bar of the present disclosure implements the following actions and effects.

First, it is possible to manufacture a cowl cross bar with no cracks using an Al material. Second, all disadvantages of the existing steel pipe welding product with a welding quality problem using the Al material are solved. Third, when compared with the existing room temperature axial tube without surface treatment and high frequency application, a tube expansion ratio of the Al material can be increased twice or more (about 40%) and a salty water spray evaluation (about 480 hours) can be satisfied so that improvement in corrosion resistance of the cowl cross bar can be achieved.

While the present disclosure has been described with reference to the accompanying drawings and the disclosed embodiments, it should be apparent to those of ordinary skill in the art that various changes and modifications can be made without departing from the spirit and scope of the present disclosure. The present disclosure is not limited to the embodiments disclosed herein. Accordingly, it should be noted that such alternations or modifications fall within the scope of the claims of the present disclosure, and that the scope of the present disclosure should be construed on the basis of the appended claims.

What is claimed is:

1. A drawing method for drawing an axial tube made of compositional components of an aluminum (Al) alloy, the drawing method comprising:
   performing an etching and a heat treatment to improve a tube reduction ratio of an extruded pipe made of the compositional components of the aluminum (Al) alloy; and
   reducing and drawing the extruded pipe to allow the extruded pipe to have a difference in diameter using an axial tube mold.

2. The drawing method of claim 1, wherein the compositional components of the (Al) alloy include silicon (Si) ranging from 0.2 wt % to 0.6 wt %, iron (Fe) ranging 0.35 wt % or less, copper (Cu) ranging 0.1 wt % or less, magnesium (Mg) ranging from 0.45 wt % to 0.9 wt % or less, chromium (Cr) ranging 0.1 wt % or less, zinc (Zn) ranging 0.1 wt % or less, and titanium (Ti) ranging 0.1 wt % or less.

3. The drawing method of claim 1, wherein the extruded pipe is subjected to the heat treatment after the etching.

4. The drawing method of claim 3, wherein:
   the etching includes sodium hydroxide (NaOH) etching; and
   the NaOH etching is performed at a NaOH concentration ranging from 0.5 normality (N) to 1 N for one to two minutes.

5. The drawing method of claim 4, wherein the NaOH etching forms a surface roughness of the extruded pipe in a range of 0.15 μm<Ra<1.0 μm, where Ra is an average surface roughness.

6. The drawing method of claim 3, wherein:
   the heat treatment includes a high frequency heat treatment; and
   the high frequency heat treatment is performed at a heat treatment temperature ranging from 200° C. to 300° C. for five to ten seconds.

7. The drawing method of claim 6, wherein the high frequency heat treatment improves the tube reduction ratio of the extruded pipe to 40% when compared to a tube reduction ratio without high frequency heat treatment.

8. The drawing method of claim 1, wherein the extruded pipe is formed in a cross-sectional variation structure in which a large diameter section and a small diameter section, which have the difference in diameter, are connected through a diameter reduction section.

9. The drawing method of claim 8, wherein the large diameter section and the small diameter section have the tube reduction ratio of 40%.

10. The drawing method of claim 8, wherein the extruded pipe is applied as a cowl cross bar constituting a cockpit module of a vehicle in a cross-sectional change structure.

\* \* \* \* \*